US008705256B2

United States Patent
O'Brien et al.

(10) Patent No.: US 8,705,256 B2
(45) Date of Patent: Apr. 22, 2014

(54) POWER CONVERSION SYSTEM AND METHOD FOR CONVERTING DC POWER AT A DC BUS INTO AC POWER

(75) Inventors: Kathleen Ann O'Brien, Niskayuna, NY (US); Zhuohui Tan, Shanghai (CN); Xinhui Wu, Shanghai (CN); Maozhong Gong, Shanghai (CN); Xueqin Wu, Shanghai (CN)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 13/324,154

(22) Filed: Dec. 13, 2011

(65) Prior Publication Data
US 2012/0314467 A1    Dec. 13, 2012

(30) Foreign Application Priority Data
Dec. 22, 2010   (CN) .......................... 2010 1 0613304

(51) Int. Cl.
H02M 3/24       (2006.01)
H02M 7/44       (2006.01)
H02M 7/537      (2006.01)
H02M 7/5387     (2007.01)

(52) U.S. Cl.
USPC .............. 363/95; 363/97; 363/98; 363/131; 363/132

(58) Field of Classification Search
USPC .............. 363/95, 97, 98, 131, 132; 323/906
See application file for complete search history.

(56) References Cited

U.S. PATENT DOCUMENTS

| 5,719,758 | A  | * | 2/1998  | Nakata et al. ................. 363/98  |
| 6,081,104 | A  | * | 6/2000  | Kern ............................ 323/268 |
| 6,166,929 | A  | * | 12/2000 | Ma et al. ...................... 363/37  |
| 6,984,970 | B2 | * | 1/2006  | Capel .......................... 323/299 |
| 7,126,294 | B2 | * | 10/2006 | Minami et al. ................. 318/139 |
| 7,319,313 | B2 |   | 1/2008  | Dickerson et al.                       |
| 7,495,410 | B2 | * | 2/2009  | Zargari et al. ................ 318/729 |
| 7,502,241 | B2 |   | 3/2009  | Taylor                                 |
| 7,719,140 | B2 |   | 5/2010  | Ledenev et al.                         |
| 8,310,197 | B2 | * | 11/2012 | Chen et al. ................... 318/801 |
| 8,310,214 | B2 | * | 11/2012 | Rivera et al. ................. 323/207 |
| 8,422,249 | B2 | * | 4/2013  | Cooper et al. ................. 363/17  |

(Continued)

FOREIGN PATENT DOCUMENTS

CN      101119031 A     2/2008
CN      101499664 A     8/2009

(Continued)

OTHER PUBLICATIONS

Translated Chinese Office Action issued in connection with corresponding CN Patent Application No. 201010613304.7 dated on Jan. 28, 2014.

*Primary Examiner* — Timothy J Dole
*Assistant Examiner* — Yusef Ahmed
(74) *Attorney, Agent, or Firm* — Peter T. DiMauro; Global Patent Operation (57) ABSTRACT

Embodiments of the invention relate to a power system for converting direct current ("DC") power on a DC bus into alternating current ("AC") power with a regulated voltage output and for feeding the AC power to an electrical system which may include a power utility or an electric grid, for example. A power conversion control system is used for controlling the power conversion and for maintaining the DC bus voltage ("DC voltage") at a certain level.

10 Claims, 12 Drawing Sheets

(56) References Cited

U.S. PATENT DOCUMENTS

| | | | |
|---|---|---|---|
| 2001/0015904 A1* | 8/2001 | Kimura et al. | 363/131 |
| 2009/0216387 A1 | 8/2009 | Klein | |
| 2009/0279336 A1 | 11/2009 | Erdman et al. | |
| 2010/0157638 A1 | 6/2010 | Naiknaware et al. | |
| 2010/0195361 A1* | 8/2010 | Stem | 363/132 |
| 2012/0057383 A1* | 3/2012 | Wei et al. | 363/98 |
| 2012/0256571 A1* | 10/2012 | Ang | 318/400.3 |

FOREIGN PATENT DOCUMENTS

| | | |
|---|---|---|
| CN | 101860038 A | 10/2010 |
| JP | 3229616 B2 | 9/2001 |
| WO | 97/28220 A1 | 8/1997 |

* cited by examiner

POWER CONVERSION SYSTEM AND METHOD FOR CONVERTING DC POWER AT A DC BUS INTO AC POWER

BACKGROUND OF THE INVENTION

1. Field of the Invention

The disclosure relates generally to power conversion systems and methods for converting direct current power at a DC bus into alternating current power to feed an electrical system.

2. Description of the Prior Art

Solar power is an important renewable energy source that has attracted a lot of attention in recent years. However, solar power remains expensive as compared with other sources of electricity. Thus, devices such as maximum power point tracking (MPPT) circuits are used to extract the maximum amount of power from solar power generation systems.

A typical solar power generation system includes a solar power source, a DC bus for receiving direct current power from the solar power source, and a line side converter for converting the direct current power at the DC bus into alternating current power for feeding a utility or grid. The solar power generation system also includes a power conversion control system for controlling operation of the power conversion. One of the most important control objectives of the power conversion control system is to maintain the DC voltage ($V_{dc}$) of the DC bus at a certain level. One conversion control strategy for controlling the DC voltage is to control the MPPT circuit according to a measured DC voltage feedback signal ($V_{dc\_feedback}$). When the DC voltage feedback signal is too high, the solar power source may be regulated to output less power. However, when the DC voltage feedback signal is too low, if the solar power source is working at about the maximum power output, it is difficult to extract more power to increase the DC voltage. Accordingly, many solar power generation systems either operate slightly below the maximum power output (resulting in less cost effective power production) or use additional energy storage for maintaining the DC voltage (resulting in additional equipment cost).

There is a need in the art to provide an improved method and system for maintaining the DC voltage which differs from conventional methods or systems and addresses one or more of the above discussed problems.

BRIEF SUMMARY OF THE INVENTION

In accordance with one embodiment disclosed herein, a power system includes a power source, a DC bus for receiving DC power from the power source, a line side converter electrically coupled to the DC bus for converting the DC power from the DC bus to AC power with a regulated voltage output to feed an electrical system; and a power conversion control system comprising a line side controller for controlling operation of the line side converter. The line side converter receives a voltage amplitude signal representative of the regulated voltage output, obtains a DC voltage difference signal using a DC voltage feedback signal of the DC bus and a DC voltage command signal, obtains a power command signal, and obtains a power feedback signal. The line side controller uses the DC voltage difference signal, the power command signal, and the power feedback signal to generate a phase angle control signal, and further generates a control signal for the line side converter using the voltage amplitude signal and the phase angle control signal.

In accordance with another embodiment disclosed herein, a solar power system comprises a solar power source for generating DC power, a DC bus for receiving the DC power, a DC-to-AC power converter for converting DC power at the DC bus into AC power, and a line side controller for generating a control signal for the DC-to-AC power converter. The line side controller comprises a power regulator for obtaining a power imbalance signal using a power feedback signal and a power command signal, and for generating an internal frequency signal using the power imbalance signal. An integrator generates a phase angle signal by integrating the internal frequency signal. A DC voltage regulator obtains a DC voltage difference signal using a DC voltage feedback signal of the DC bus and a DC voltage command signal. The line side controller is configured for using the DC voltage difference signal to directly or indirectly adjust the phase angle signal. The line side converter further comprises a modulator for generating a control signal for the line side converter based at least in part on the phase angle signal.

In accordance with another embodiment disclosed herein, a method of converting DC power at a DC bus into AC power comprises obtaining a power imbalance signal according to a power command, signal and, a power feedback signal, using the power imbalance signal to generate an internal frequency signal, integrating the internal frequency signal to generate a phase angle signal, obtaining a DC voltage difference signal according to a DC voltage command signal and a DC voltage feedback signal, and using the DC voltage difference signal to directly or indirectly adjust the phase angle signal.

BRIEF DESCRIPTION OF THE DRAWINGS

These and other features, aspects, and advantages of the present invention will become better understood when the following detailed description is read, with reference to the accompanying drawings in which like characters represent like parts throughout the drawings, wherein.

DETAILED DESCRIPTION OF THE INVENTION

Embodiments of the invention relate to a power system for converting direct current ("DC") power on a DC bus into alternating current ("AC") power with a regulated voltage output and for feeding the AC power to an electrical system which may include a power utility or an electric grid, for example. A power conversion control system is used for controlling the power conversion and for maintaining the DC bus voltage ("DC voltage") at a certain level.

Figure 1:
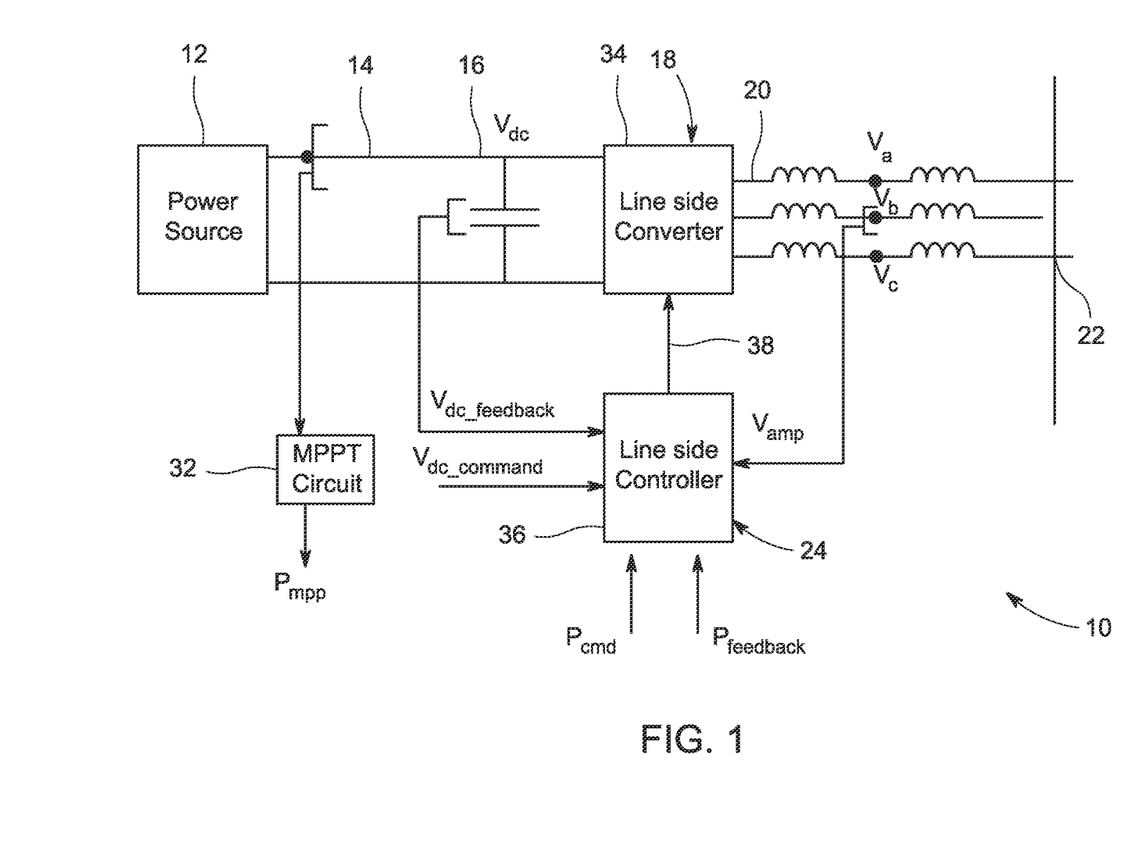
FIG. 1 is a block diagram of a power system in accordance with one embodiment of the invention.

Referring to FIG. 1, an exemplary power system 10 includes a power source 12 for delivering DC power 14 to a DC bus 16, a power conversion module 18 for converting the DC power 14 into an AC power 20 with a regulated voltage output and feeding the regulated voltage output to an electrical system 22, and a power conversion control system 24 ("control system 24") for controlling operations of the power conversion module 18 and for maintaining a DC voltage ($V_{dc}$) at the DC bus 16 at a certain value or within a certain value range. In the illustrated, embodiment, power system 10 comprises a three-phase power system that generates three-phase AC power 20.

In one embodiment, the power source 12 may comprise a solar power source such as a photovoltaic (PV) panel or a battery module such as a fuel cell for delivering DC power so as to directly or indirectly feed the DC power 14 to the DC bus 16. In other embodiments, the power source 12 may comprise another type of power generator such as a wind turbine, a marine hydrokinetic energy turbine, a gas turbine, or a steam turbine for generating AC power and an AC-to-DC converter (such as represented by source side converter 72 of FIG. 11) for converting the AC power into the DC power 14.

Figure 2:
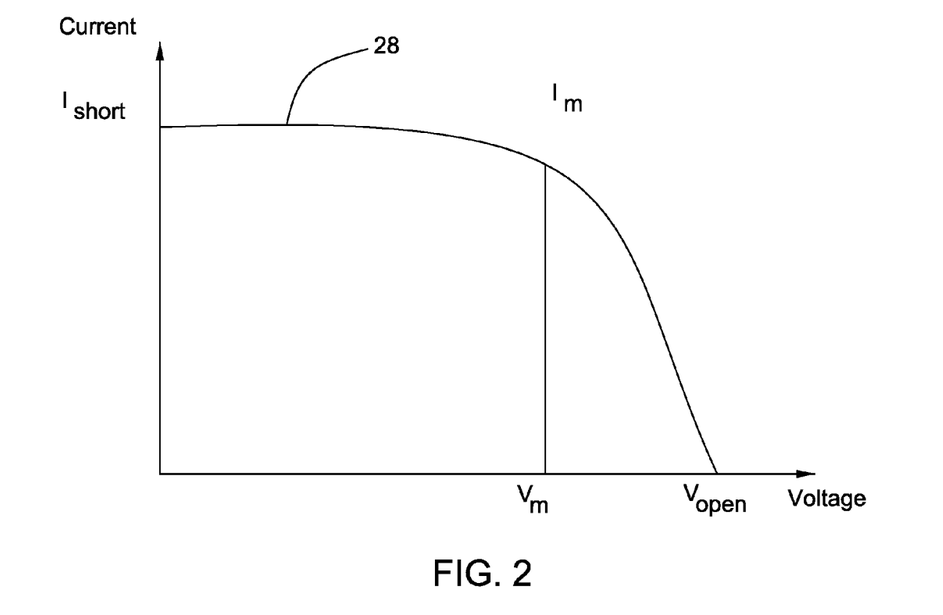
FIG. 2 illustrates a voltage-current curve for a solar power source.
Figure 3:
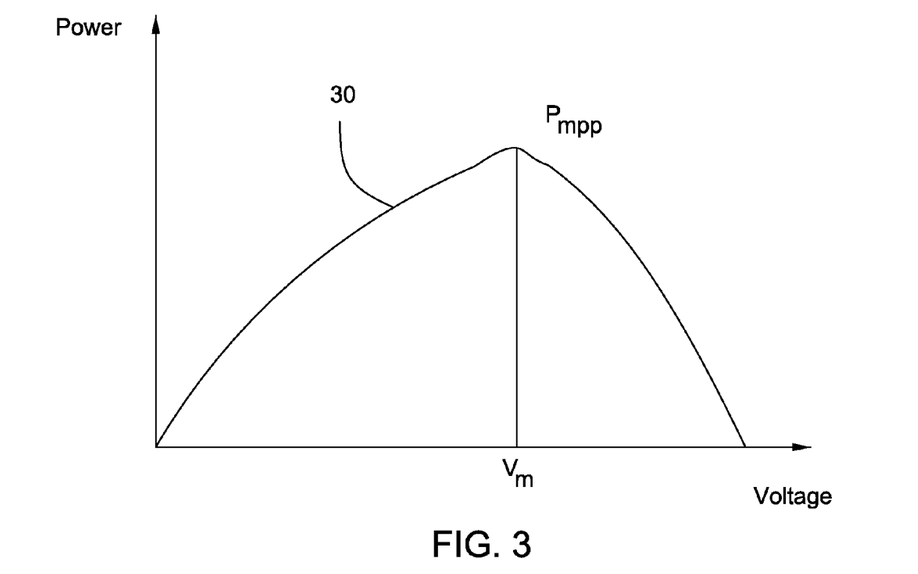
FIG. 3 illustrates a voltage-power curve for a solar power source.

In the illustrated embodiment of FIG. 1, power source 12 comprises a solar power source comprising a PV panel or a series of PV panels. Power module 12 is operated to work substantially on a power limit or maximum power point (MPP) where the values of the current and voltage of the power source 12 result in a maximum power output. In other embodiments such as wherein power source 12 comprises another type of power source such as a fuel cell battery, the other power source may also be working on a power limit. Referring to FIGS. 2 and 3, a current-voltage curve (V-I curve) 28 of FIG. 2 illustrates the voltage-current characteristic of power source 12 under certain operating conditions, and a power-voltage curve (P-V curve) 30 of FIG. 3 illustrates the corresponding power characteristic of power source 12 under the same conditions. The voltage at the V-I curve is almost zero at a short circuit current ($I_{short}$) when the output terminals of the PV panels are shorted together. As the output voltage increases, the current value of V-I curve 28 remains at a substantially constant level until it reaches a knee point ($I_m$, $V_m$) at which it descends rapidly toward zero current at an open circuit voltage output ($V_{open}$).

Referring to FIG. 3, in certain embodiments, P-V curve 30 is the current times the voltage at each point along V-I curve 28. P-V curve 30 has a maximum power ($P_{mpp}$) corresponding to the knee point of the V-I curve in FIG. 2, which is known as the MPP. The MPP tends to change based on changes on the operating conditions such as illumination level, temperature, and age of the PV panels. In the illustrated embodiment of FIG. 1, power system 10 includes a maximum power point tracking (MPPT) circuit 32 for tracking the MPP and ensuring that power source 12 works substantially at the MPP.

In the illustrated embodiment of FIG. 1, power conversion module 18 comprises a line side converter or DC-to-AC power converter 34 which receives DC power 14 from power source 12, and converts the DC power 14 into the AC power 20. In the illustrated embodiment, line side converter 34 functions as a voltage source for electrical system 22. In other words, line side controller 36 controls the phase and amplitude of the output voltage of line side converter 34. In certain embodiments, line side converter 34 comprises a plurality of semiconductor switches (not shown) such as Integrated Gate Commutated Thyristors (IGCTs) and/or Insulated Gate Bipolar Transistors (IGBTs). Control system 24 comprises a line side controller 36 sending control signals 38 for controlling turn-on or turn-off actions of the semiconductor switches to generate the regulated voltage output.

With continued reference to FIG. 1, line side controller 36 receives a DC voltage feedback signal ($V_{dc\_feedback}$) which is a measured DC voltage at DC bus 16, a DC voltage command signal ($V_{dc\_cmd}$), a power command signal ($P_{cmd}$), a power feedback signal ($P_{feedback}$), the maximum power signal ($P_{mpp}$), and a voltage amplitude signal ($V_{amp}$) to generate the control signals 38 for line side converter 34. In one embodiment, line side controller 36 receives a measured three-phase voltage signal ($V_a$, $V_b$, $V_c$) of the regulated voltage output to calculate the voltage amplitude signal.

Figure 4:
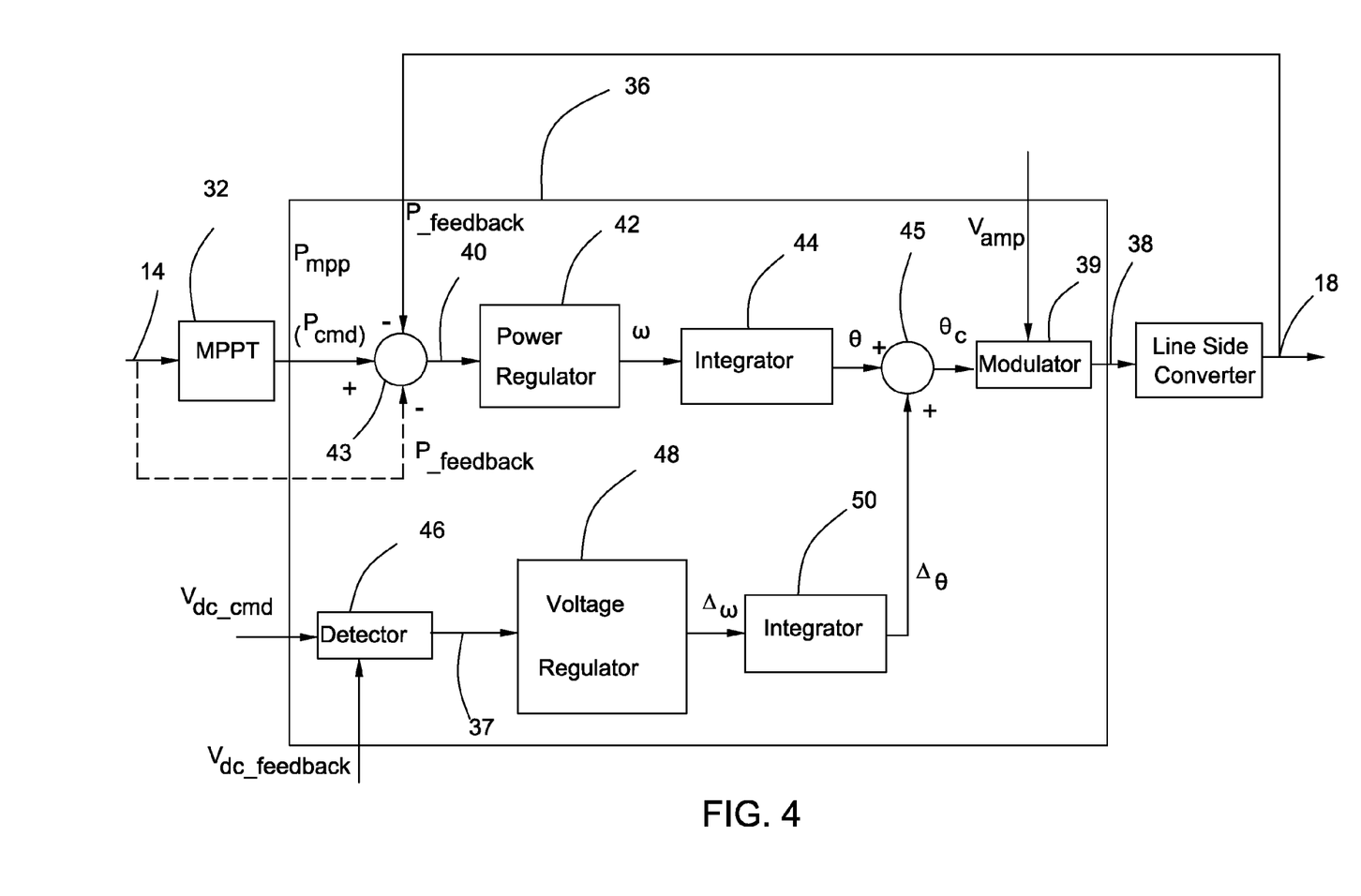
FIG. 4 illustrates a control block diagram for a power conversion control system of the power system of FIG. 1, according to one embodiment.

Referring to FIG. 4, line side controller 36 according to one embodiment comprises a power regulator 42, an integrator 44, a detector 46, a voltage regulator 48, an integrator 50, a modulator 39, and two summation elements 43 and 45 which are collectively used to generate PWM control signals 38 for line side converter 34.

In the illustrated embodiment of FIG. 4, line side controller 36 receives power command signal ($P_{cmd}$) an power feedback signal ($P_{feedback}$) and generates a power imbalance (or difference) signal 40. In the illustrated embodiment, the power command signal is the maximum power signal ($P_{mpp}$) generated by MPPT circuit 32. In another embodiment, the power command signal is a scheduled power command from a supervisor controller, e.g. a command signal from a distribution system operator (DSO) or a transmission system operator (TSO). In one embodiment, line side controller 36 has a closed loop power control and uses a measured power signal from AC power 20 as the power feedback signal ($P_{feedback}$). In another embodiment, as illustrated by the dotted line, line side controller 36 uses an open loop power control strategy and uses a measured power signal from the DC power 14 as the power feedback signal ($P_{feedback}$). In another embodiment, the power feedback signal ($P_{feedback}$) may comprise a blended signal including both the measured power signal from the DC power 14 and the measured power signal from AC power 20. In one embodiment, the blended signal comprises an average value of the measured power signals from DC power 14 and AC power 20. In one embodiment, power imbalance signal 40 is a difference between the power command and feedback signals ($P_{cmd}$, $P_{feedback}$) obtained by summation element 43. A power regulator 42 uses power imbalance signal 40 to generate an internal frequency signal ($\omega$). In certain embodiments, the internal frequency signal ($\omega$) is different from the frequency of electrical system 22. A phase angle signal ($\theta$) is generated by integrating the internal frequency signal ($\omega$) using an integrator 44.

Figure 5:
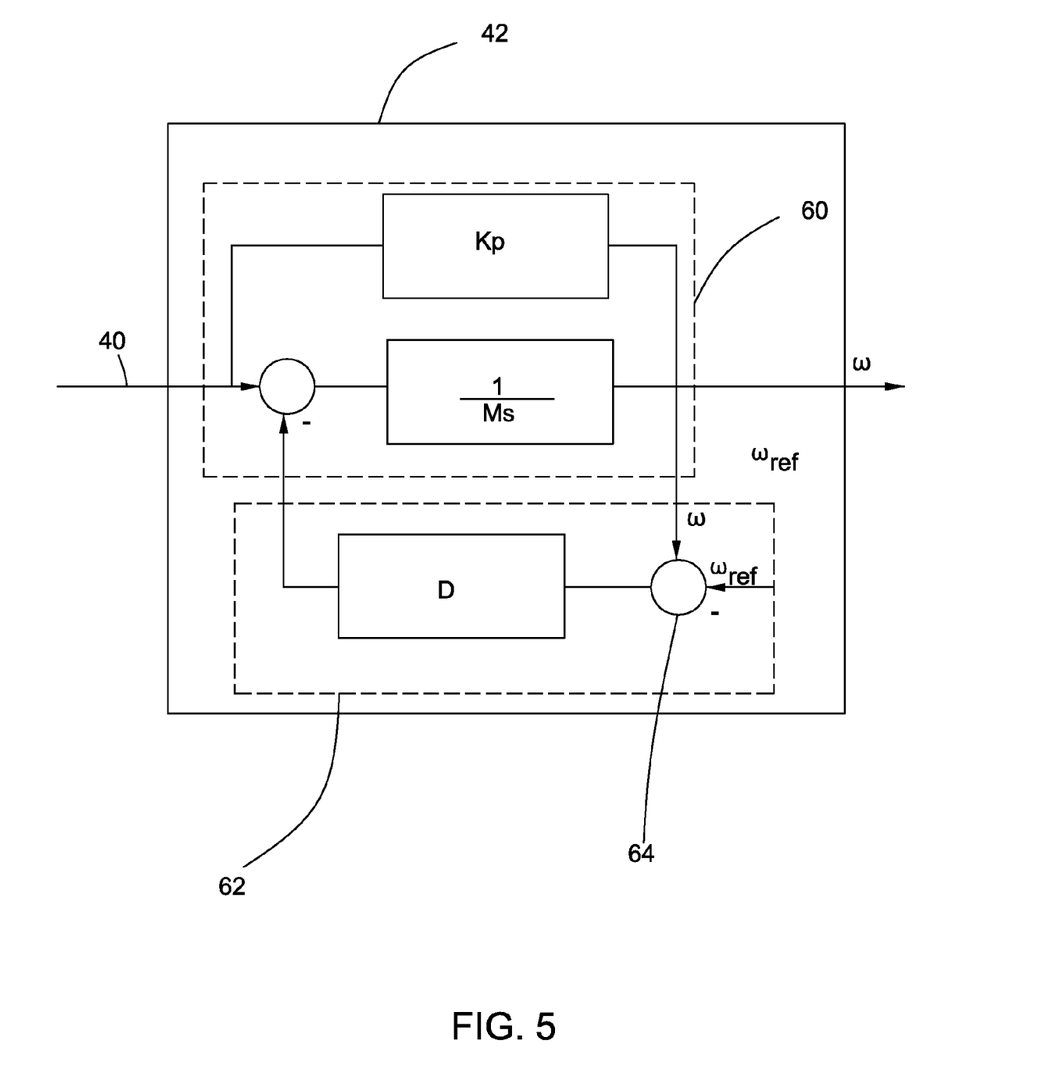
FIG. 5 illustrates a control block diagram of a power regulator for generating an internal frequency signal according to one embodiment.

One exemplary embodiment of the power regulator 42 for generating the internal frequency signal ($\omega$) is illustrated in FIG. 5. In this embodiment, power regulator 42 comprises a PI regulator 60 and a droop loop 62. PI regulator 60 uses the power imbalance signal 40 to generate the internal frequency signal ($\omega$). Droop loop 62 comprises a comparator 64 to compare the internal frequency signal ($\omega$) with a frequency base signal ($\omega_{ref}$) and use a difference thereof to limit the power imbalance signal 40.

Referring back to FIG. 4, line side controller 36 further comprises a detector 46 for receiving DC voltage command signal ($V_{dc\_cmd}$) and DC voltage feedback signal ($V_{dc\_feedback}$) to generate DC voltage difference signal 37. In one embodiment, DC voltage difference signal 37 comprises the difference between the DC voltage command and feedback signals ($V_{dc\_cmd}$, $V_{dc\_feedback}$). In the illustrated embodiment, a voltage regulator 48 generates a frequency correction signal ($\Delta\omega$) using the DC voltage difference signal 37 which reflects the DC voltage error. In one embodiment, voltage regulator 48 comprises a PI regulator, for example. An integrator 50 integrates the frequency correction signal ($\Delta\omega$) to generate a phase angle correction signal ($\Delta\theta$). In the illustrated embodiment, the phase angle signal ($\theta$) is adjusted by the phase angle correction signal ($\Delta\theta$) at summation element 45 to obtain a phase angle control signal ($\theta_c$).

In certain embodiments, modulator 39 receives the phase angle control signal and the voltage amplitude signal and uses these signals for generating PWM control signals 38. In one exemplary embodiment, modulator 39 uses the voltage phase angle and amplitude signals to generate a 2-phase signal, and then converts the 2-phase signal into generate 3-phase voltage command signals for use by line side converter 34.

In operation, when the measured DC voltage feedback signal ($V_{dc\_feedback}$) is too high, the phase angle correction signal ($\Delta\theta$) is positive, and the phase angle control signal ($\theta_c$) is increased. Line side converter 34 is accordingly regulated to output more power to electrical system 22 to decrease the DC voltage. When the measured DC voltage feedback signal is too low, the phase angle correction signal ($\Delta\theta$) is negative, and the phase angle control signal ($\theta_c$) is decreased. Line side converter 34 is accordingly regulated to output less power to electrical system 22 to increase the DC voltage.

Figure 6:
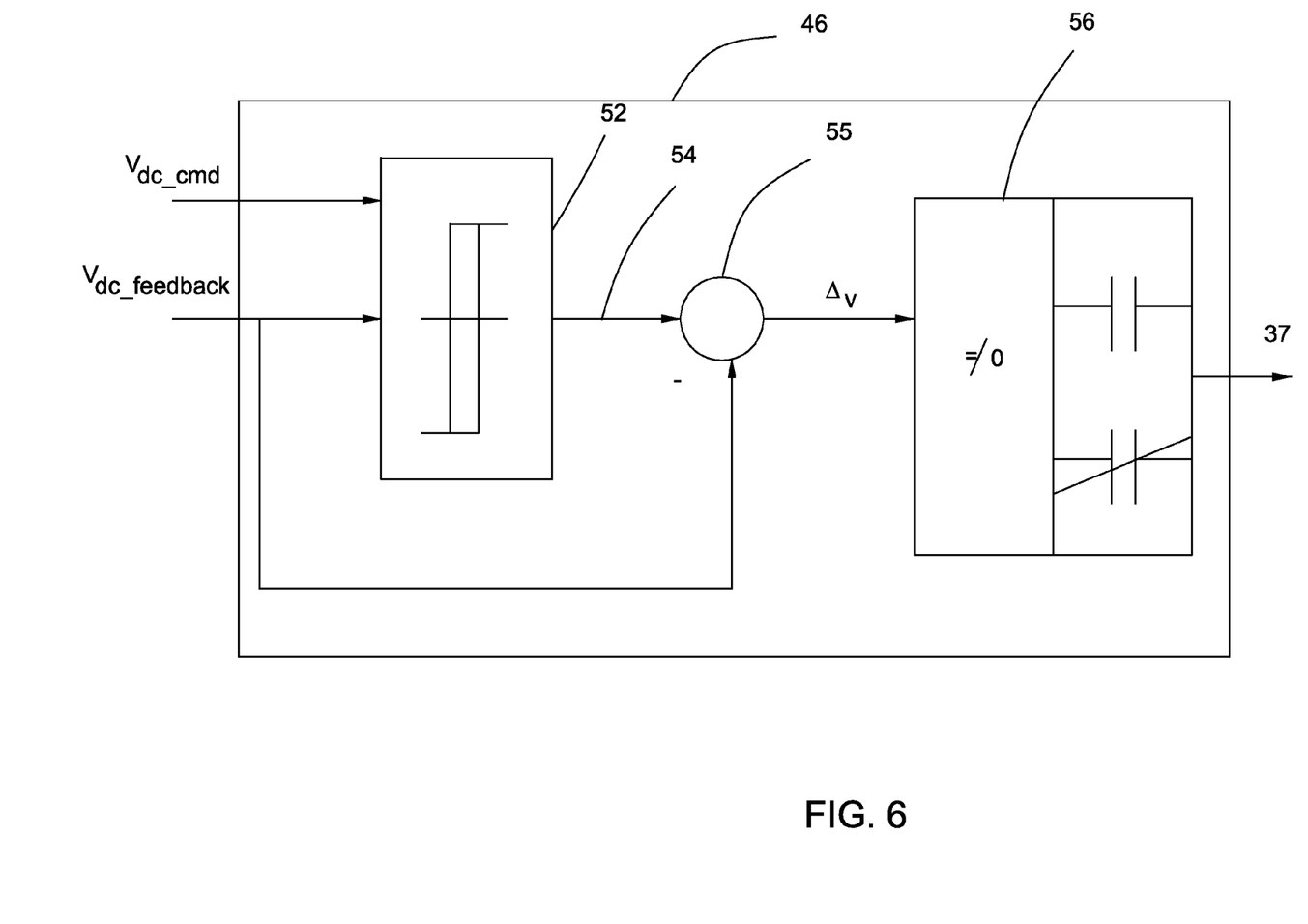
FIG. 6 illustrates a control block diagram of a detector for generating a DC voltage error signal according to one embodiment.

Another embodiment for generating the DC voltage difference signal 37 via detector 46 is illustrated in FIG. 6. In this embodiment, detector 46 comprises a limiter 52, and the DC voltage command signal ($V_{dc\_cmd}$) sets an upper DC voltage limit ($V_{lim-up}$) and a lower DC voltage limit ($V_{lim-dn}$) for limiter 52. The upper and lower DC voltage limits ($V_{lim-up}$, $V_{lim-dn}$) define a safe operation range of the DC voltage. When the measured DC voltage feedback signal is between the safe operation range, the voltage difference signal 37 is zero. In other words, small fluctuations of the DC voltage within the safe operation range will not be used to alter the phase angle control signal. When the measured DC voltage feedback signal ($V_{dc\_feedback}$) is beyond the range, the voltage difference signal 37 is non-zero and is used for adjusting the phase angle control signal.

In the illustrated, embodiment of FIG. 6, if the DC voltage feedback signal ($V_{dc\_feedback}$) is between the upper and lower voltage limits, an output 54 of limiter 52 is the DC voltage feedback signal ($V_{dc\_feedback}$). If the DC voltage feedback signal ($V_{dc\_feedback}$) is beyond the upper and lower voltage limits ($V_{lim-up}$, $V_{lim-dn}$), the output 54 of limiter 52 is one of the upper or lower limits (whichever is closer to the DC voltage feedback signal ($V_{dc\_feedback}$)). Output 54 of the limiter 52 is deducted by the DC voltage feedback signal ($V_{dc\_feedback}$) at a deductor 55. In the illustrated embodiment, detector 46 further comprises a logic unit 56 for receiving a result from the deductor 55. If the DC voltage feedback signal ($V_{dc\_feedback}$) is between the upper and lower voltage limits, the result from the deductor 55 is zero, and the logic unit 56 does not send a DC voltage difference signal to alter the phase angle control signal ($\theta_c$). If the DC voltage feedback signal ($V_{dc\_feedback}$) is beyond the upper and lower voltage limits, the result of the deductor 55 is a DC voltage difference between the DC voltage feedback signal and one of the upper and lower limits which is closer to the DC voltage feedback signal ($V_{dc\_feedback}$), and logic unit 56 sends this DC voltage error signal as the DC voltage difference signal 37 to adjust the phase angle control signal ($\theta_c$).

Figure 7:
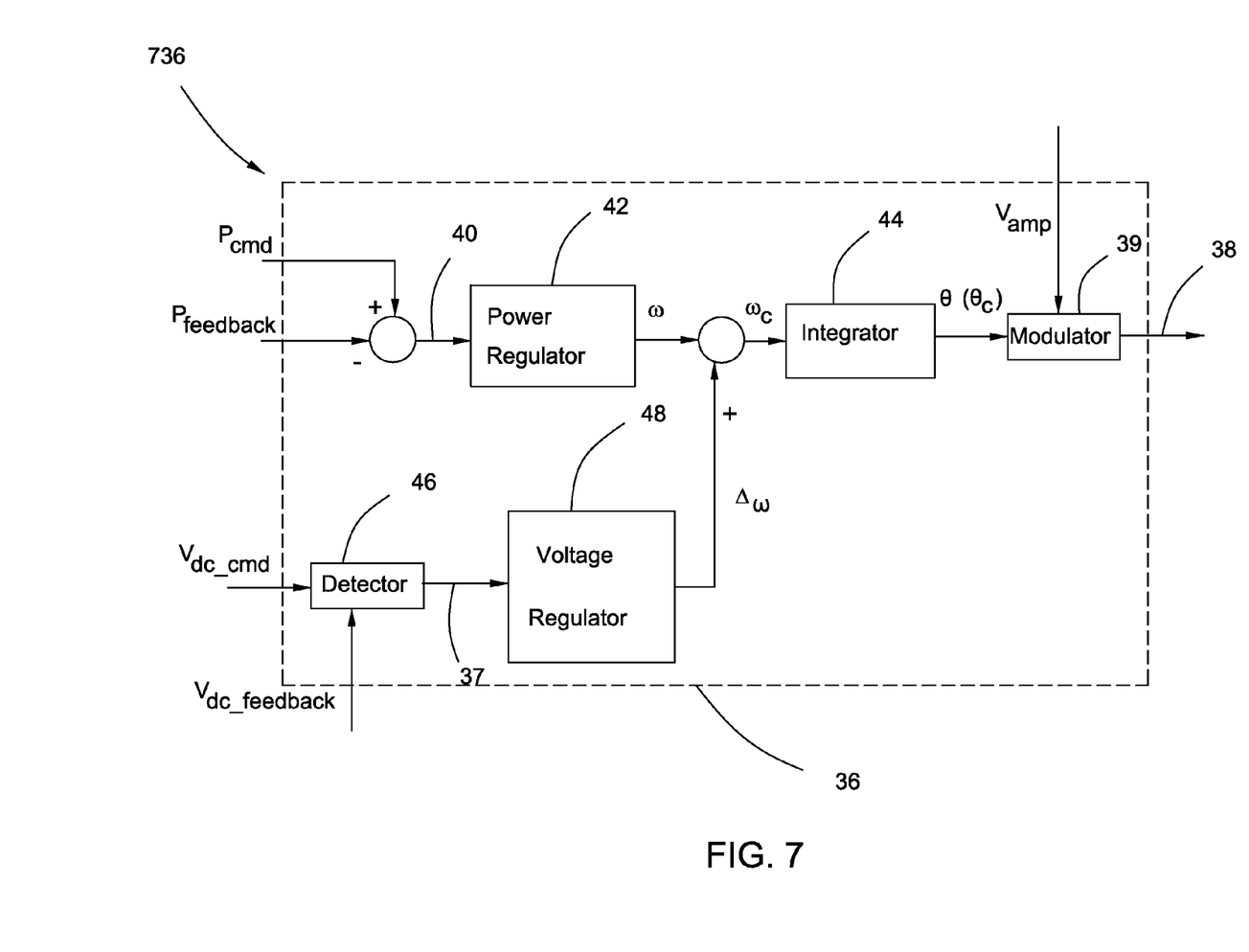
FIG. 7 illustrates a control block diagram for a power conversion control system according to another embodiment.
Figure 8:
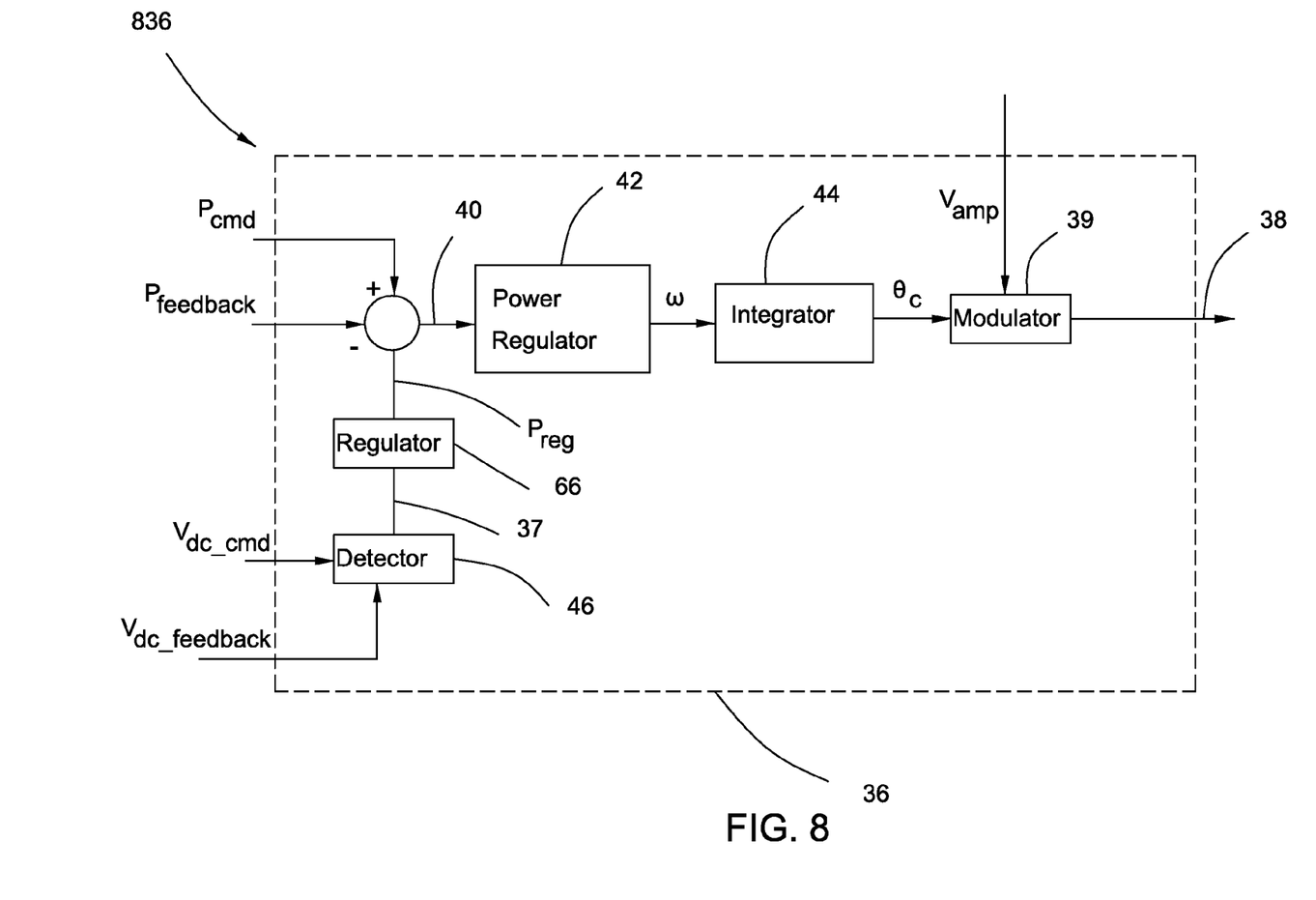
FIG. 8 illustrates a control block diagram for a power conversion control system according to still another embodiment.
Figure 9:
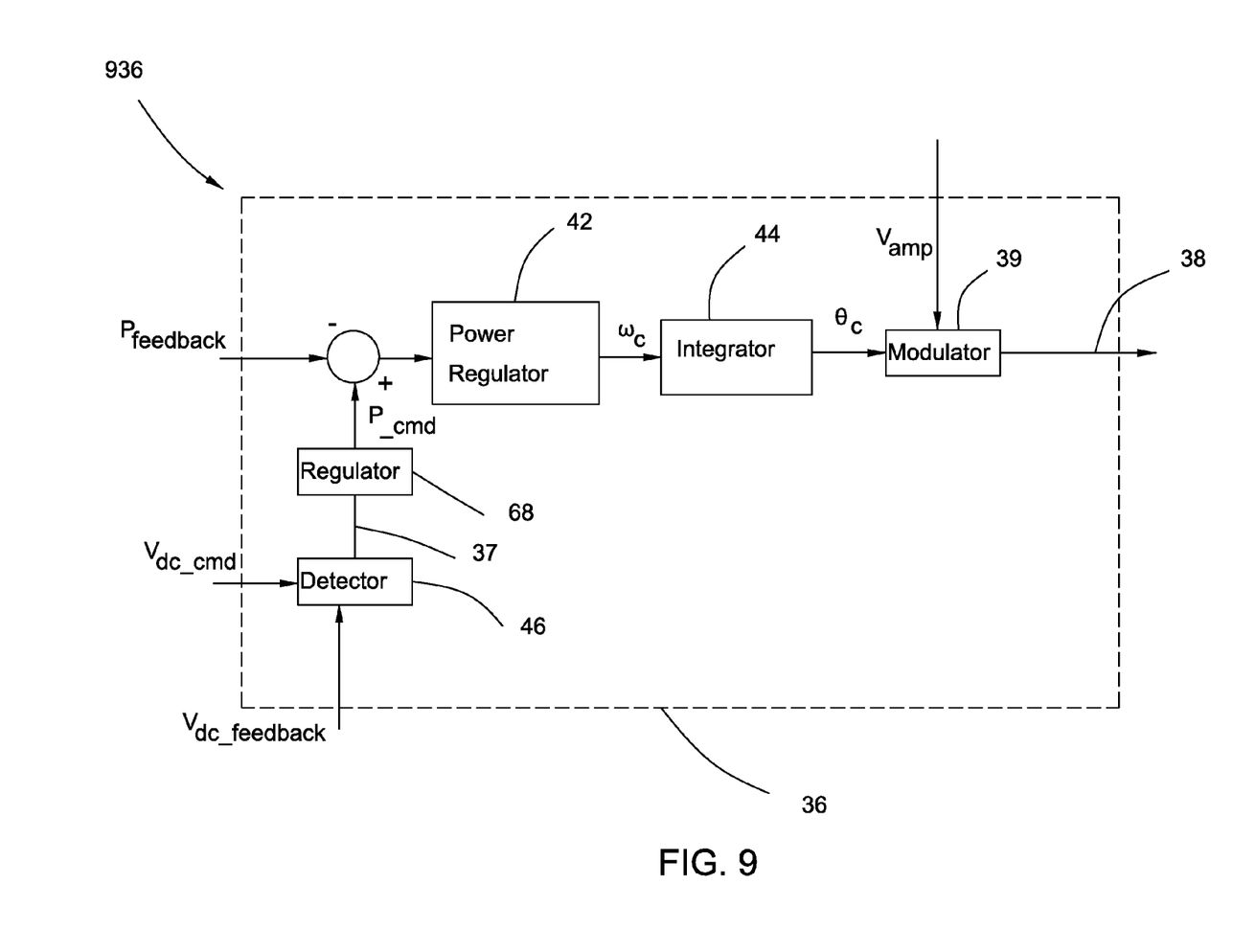
FIG. 9 illustrates a control block diagram for a power conversion control system according to still another embodiment.

FIGS. 7, 8 and 9 illustrate different embodiments of line side controllers 736, 836, 936 for indirectly changing the phase angle signal ($\theta$) prior to its initial calculation. The embodiment of FIG. 7 is similar to that of FIG. 4 except that the frequency correction signal ($\Delta\omega$) generated by DC voltage regulator 48 is not sent to a separate integrator but instead is used to adjust the internal frequency signal ($\omega$) to obtain an internal frequency control signal ($\omega_c$). Integrator 44 uses the internal frequency control signal ($\omega_c$) to generate a phase control signal that is sent directly to modulator 39. In the embodiment of FIG. 8, the voltage difference signal 37 generated by detector 46 is used to generate a power regulation signal ($P_{reg}$) by a regulator 66, and the power regulation signal ($P_{reg}$) is used to adjust the power imbalance signal 40. Thus the frequency from power regulator 42 already includes any adjustments required by the power regulation system. In one embodiment, regulator 66 generates the power regulation signal using a PI regulator. In the embodiment of FIG. 9, in which no MPPT controller 32 (FIG. 1) is required, control system 24 comprises a regulator 68 for generating the power command signal ($P_{cmd}$) using the DC voltage difference signal 37 by regulating the DC voltage difference to zero.

Figure 10:
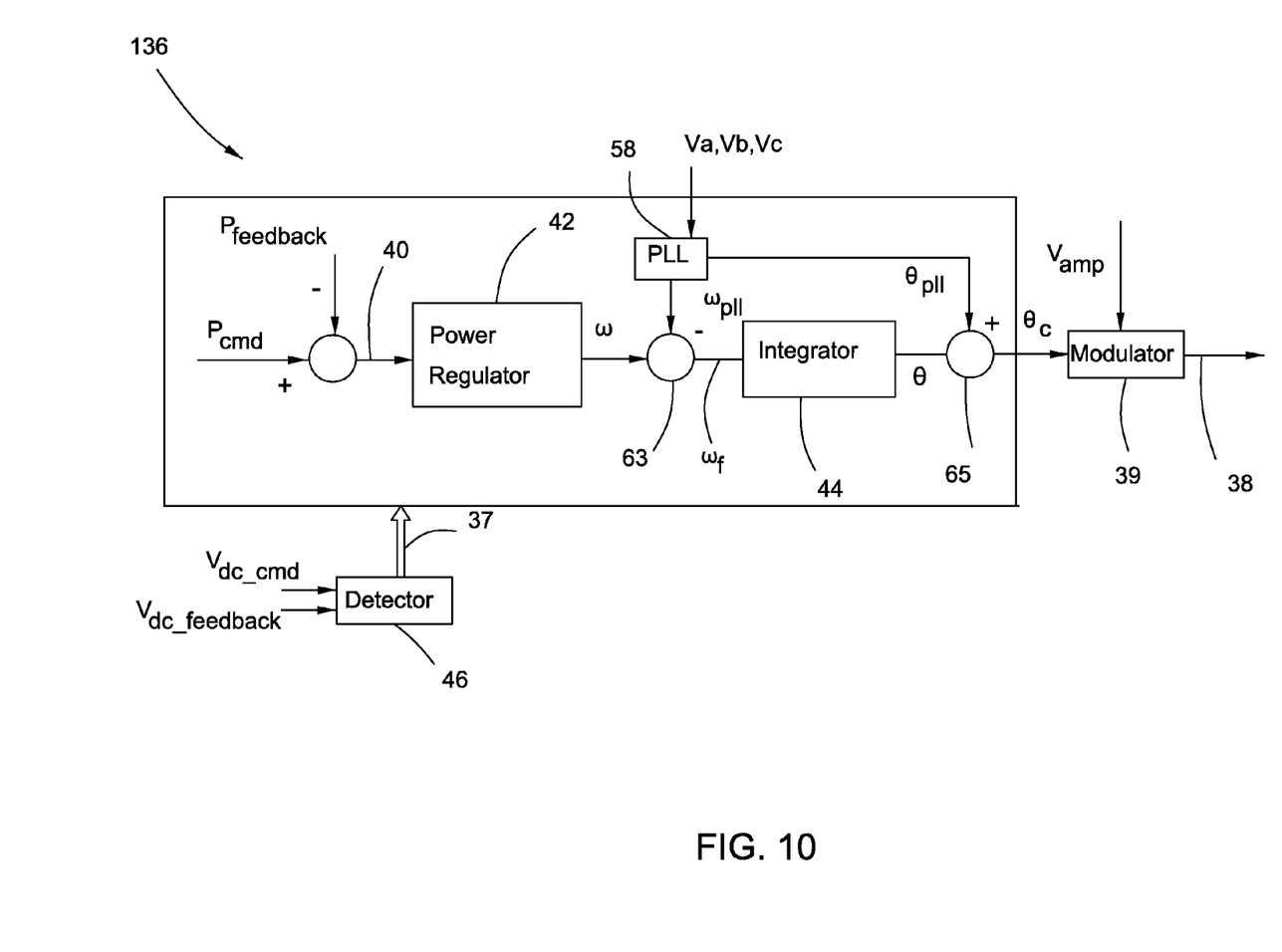
FIG. 10 illustrates a control block diagram for a power conversion control system according to still another embodiment.

In still another embodiment as illustrated in FIG. 10, line side controller 136 further comprises a PLL circuit 58 to detect three phase voltages (Va, Vb, Vc) of the regulated voltage output and generate a frequency reference signal ($\omega_{pll}$) and phase angle reference signal ($\theta_{pll}$) of the line side converter 34. Control system 24 uses the frequency and phase angle reference signals ($\omega_{pll}$, $\theta_{pll}$) to limit the internal frequency and phase angle signals ($\omega$, $\theta$). In the illustrated embodiment, the internal frequency ($\omega$) generated by PI regulator 60 is subtracted from the frequency reference signal (($\omega_{pll}$, $\theta_{pll}$) at summation element 63, and a frequency difference ($\omega_f$) thereof is sent to integrator 44. Integrator 44 comprises a limiter with upper and lower difference values. If the frequency difference ($\omega_f$) is between the upper and lower difference values, integrator 44 generates a phase angle signal ($\theta$) according to the frequency difference ($\omega_f$). If the frequency difference ($\omega_f$) is beyond the upper or lower difference values, integrator 44 generates a phase angle signal ($\theta$) according to one of the upper or lower difference values which is closer to the frequency difference. In the illustrated embodiment, the phase angle reference signal ($\theta_{pll}$) is add to the phase angle signal from integrator 44 at summation element 65. Accordingly, the frequency and phase angle reference signals ($\omega_{pll}$, $\theta_{pll}$) from PLL circuit 58 are used to limit the variation of the internal frequency and phase angle signals ($\omega$, $\theta$) for protection purposes but not for normal operating purposes.

Figure 11:
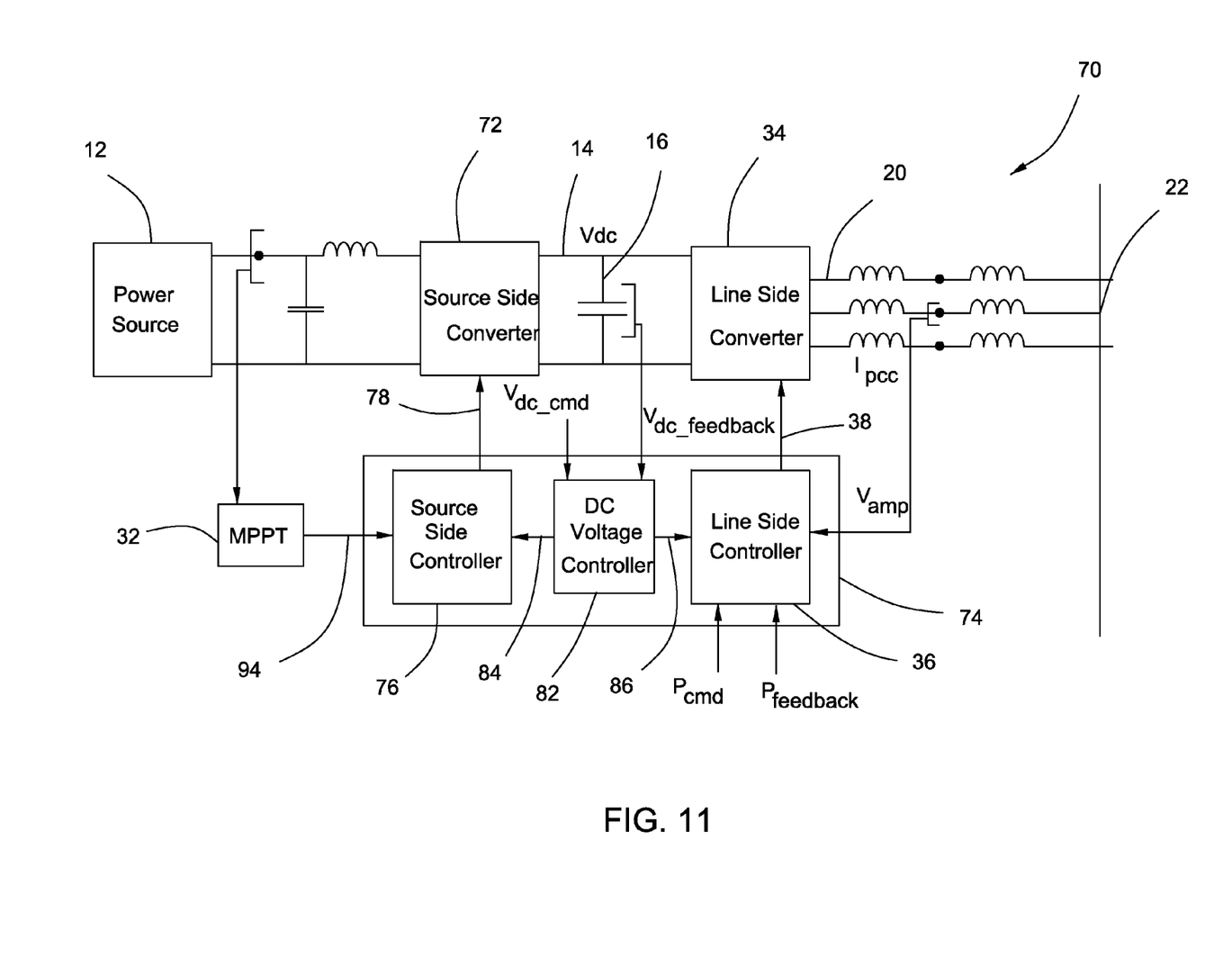
FIG. 11 illustrates a power system according to a dual stage embodiment of the invention.

Referring to FIG. 11, a power system 70 according to another embodiment further comprises a source side converter 72 for converting an electric power from power source 12 into the DC power 14. In one embodiment, the source side converter 72 comprises a DC-to DC power converter for converting a DC power from the power source 12 into DC power 14. In another embodiment, the source side converter 72 comprises an AC-to-DC power converter for converting an AC power from power source 12 into the DC power 14. In certain embodiments, source side converter 72 comprises a plurality of semiconductor switches (not shown) such as Integrated Gate Commutated Thyristors (IGCTs) and/or Insulated Gate Bipolar Transistors (IGBTs). A power conversion control system 74, in this embodiment, comprises a source side controller 76 for generating control signals 78 for source side converter 72 and a DC voltage controller 82 electrically coupled to both source side and line side controllers 76, 36. The illustrated DC voltage controller 82 may use a difference between the DC voltage command and feedback signals ($V_{dc\_cmd}$, $V_{dc\_feedback}$) to generate a source side and a line side DC voltage regulation signal 84, 86, respectively for the source side and line side controllers 76, 36.

Figure 12:
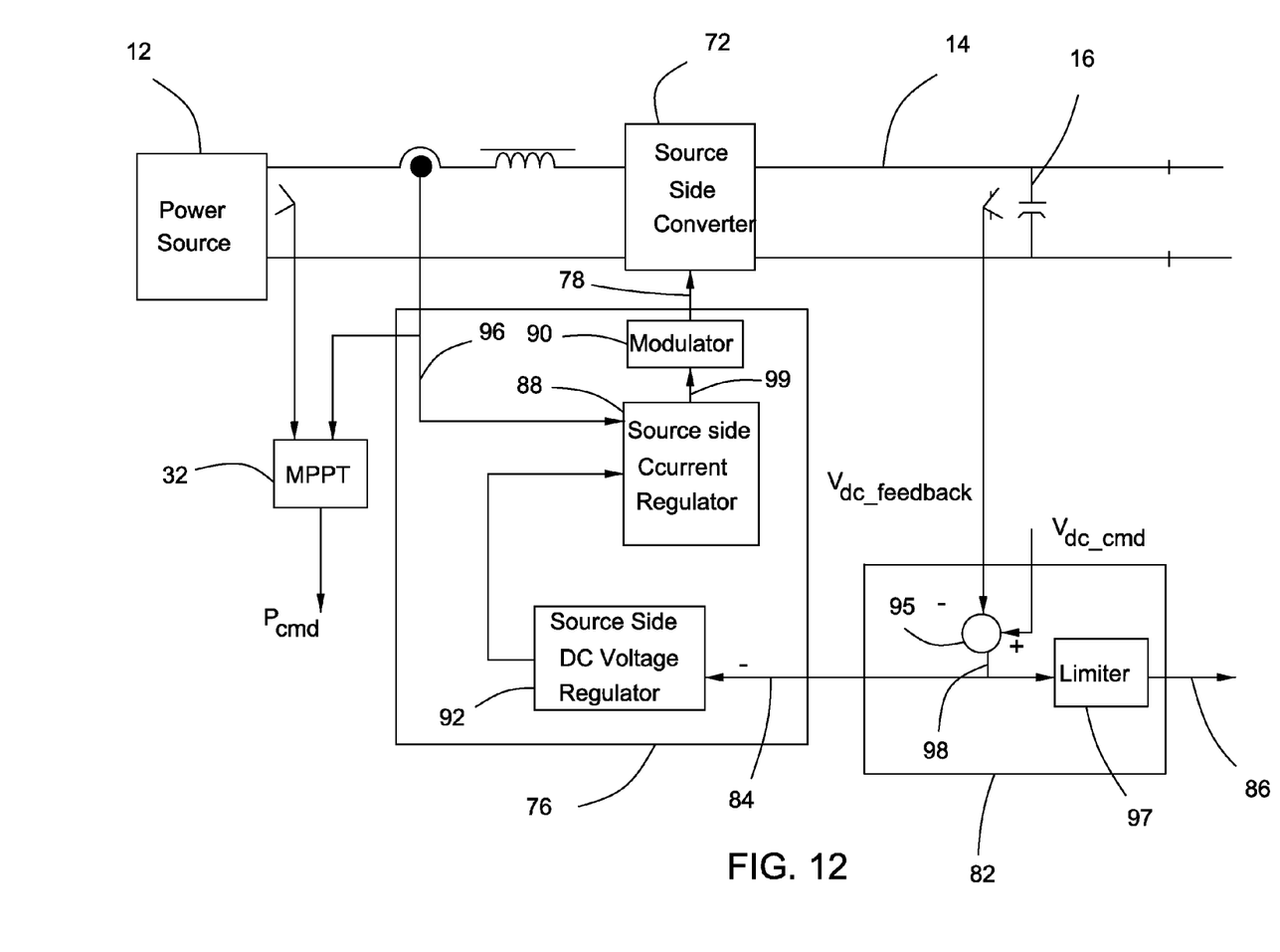
FIG. 12 illustrates several control system blocks for the power system of FIG. 11 according to one embodiment.

Referring to FIG. 12, in the illustrated embodiment, DC voltage controller 82 comprises a summation element 95 and a limiter 97. Summation element 95 receives the DC voltage command and feedback signals ($V_{dc\_cmd}$, $V_{dc\_feedback}$) and calculates the DC voltage difference signal 98 which is a difference between the DC voltage and command signals. Limiter 97 comprises DC voltage difference limit ($V_{dc\_lim}$) and receives the DC voltage difference signal 98. In certain embodiments, the DC voltage difference limit comprises a determined value or a determined voltage range. In one embodiment, if an absolute value of the voltage difference signal is smaller than the DC voltage difference limit ($V_{dc\_lim}$) or within the range of the limit, an output of the limiter 97 is none or zero; and if the absolute value of the voltage difference signal 98 is larger than the DC voltage difference limit ($V_{dc\_lim}$) or beyond the range of the limit, an output of limiter 97 is non-zero and is proportional to that absolute value.

In the illustrated embodiment, line side controller 36 (FIG. 11) receives the output of limiter 97 as the line side DC voltage regulation signal 86. Accordingly, line side controller 36 controls DC voltage by directly or indirectly changing the phase angle control signal ($\theta_c$, FIGS. 4 and 7-10) as discussed above, when the voltage difference signal 98 is larger than the DC voltage difference limit or beyond the range of the limit. In another embodiment, an output of limiter 97 is zero if the voltage difference signal 98 is negative, and is non-zero if the voltage difference signal 98 is positive. Accordingly, when there is a decrease in the DC voltage, line side controller 36 directly or indirectly decreases the phase angle control signal ($\theta_c$) to control line side converter 34 to output less power.

In the embodiment of FIG. 12, source side controller 76 receives DC voltage difference signal 98 as a source side DC voltage regulation signal 84, and thus source side controller 76 may be used for governing the DC voltage control according to the DC voltage difference or variation. In the illustrated embodiment, source side controller 76 comprises a source side current regulator 88, a modulator 90 and a source side DC voltage regulator 92. In this embodiment, current regulator 88 receives a feedback signal 96 from the electric power output of power source 12, and DC reference signal from DC voltage regulator 92 to generate current control signals 99. Modulator 90 uses the current control signals 99 to generate the control signals 78 for regulating the source side converter 72 to generate a desired current output.

Figure 13:
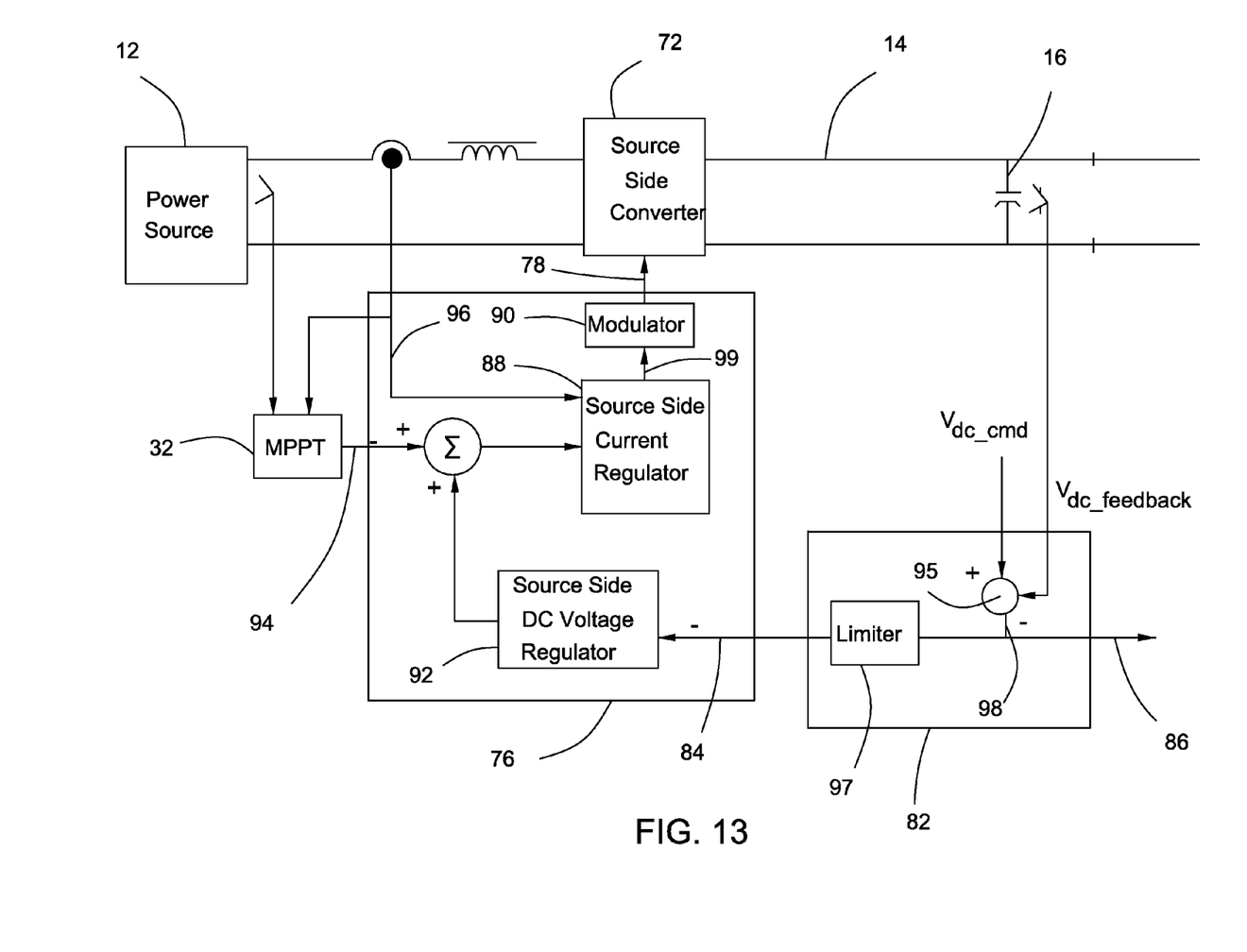
FIG. 13 illustrates a several control system blocks for the power system of FIG. 11 according to another embodiment

In the embodiment of FIG. 13, line side converter 36 receives DC voltage difference signal 98 as the line side DC voltage regulation signal 86, and thus line side controller 36 is governing the DC voltage control according to the DC voltage difference or variation. In this embodiment, source controller 76 receives the output of limiter 97 as the source side DC voltage regulation signal 84. In this embodiment, current regulator 88 receives a feedback signal 96 from the electric power output of power source 12, and a difference between a command signal 94 from MPPT circuit 32 and DC reference signal from DC voltage regulator 92 to generate current control signals 99. Accordingly, source side controller 76 controls DC voltage, only when the voltage difference signal 98 is larger than the DC voltage difference limit or beyond the range of the limit.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power system comprising;
   a power source;
   a DC bus for receiving DC power from the power source;
   a line side converter electrically coupled to the DC bus for converting the DC power from the DC bus to AC power with a regulated voltage output to feed an electrical system; and
   a power conversion control system comprising a line side controller for controlling operation of the line side converter and configured to:
      receive a voltage amplitude signal representative of the regulated voltage output;
      obtain a DC voltage difference signal using a DC voltage feedback signal of the DC bus and a DC voltage command signal;
      obtain a power command signal;
      obtain a power feedback signal;
      use the DC voltage difference signal, the power command signal, and the power feedback signal to generate a phase angle control signal; and
      generate a control signal for the line side converter using the voltage amplitude signal and the phase angle control signal.

2. The power system of claim 1, wherein the power source comprises a power limit.

3. The power system of claim 2, wherein the power source comprises a solar power source, and wherein the power system further comprises a maximum power point tracking circuit for tracking a maximum power of the power source.

4. The system of claim 3, wherein the power command signal comprises the maximum power from the maximum power point tracking circuit.

5. The system of claim 1, wherein the line side controller comprises a regulator for receiving the DC voltage difference signal to generate the power command signal.

6. The system of claim 1, wherein the power feedback signal comprises a measured power signal representative of the AC power from the line side converter.

7. The system of claim 1, wherein the power feedback signal comprises a measured power signal of the DC power on the DC bus.

8. The system of claim 1, wherein the line side controller comprises a power regulator for receiving a power imbalance signal which represents a difference of the power command and feedback signals and for generating an internal frequency signal according to the power imbalance signal, and wherein the line side controller further comprises an integrator for generating a phase angle signal by integrating the internal frequency signal.

9. The system of claim 8, wherein the line side controller comprises a voltage regulator for generating a frequency correction signal based on the DC voltage difference signal, and wherein the line side controller is configured to use the frequency correction signal to adjust the internal frequency signal in advance of the internal frequency signal being integrated by the integrator.

10. The system of claim 8, wherein the line side controller comprises a voltage regulator for generating a frequency correction signal based on the DC voltage difference signal, and a second integrator for generating a phase angle correction signal using the frequency correction signal, and wherein the line side controller is configured to use the phase angle correction signal to adjust the phase angle signal.

* * * * *